(12) United States Patent
Kaneko et al.

(10) Patent No.: US 8,004,946 B2
(45) Date of Patent: Aug. 23, 2011

(54) INFORMATION PROCESSOR, FAILURE PREDICTION METHOD, AND COMPUTER PRODUCT

(75) Inventors: Yoshihiro Kaneko, Fussa (JP); Tooru Mamata, Akiruno (JP); Makoto Ando, Hannou (JP); Toru Hanada, Ome (JP); Hiroshi Yamazaki, Ome (JP); Hiroshi Ohno, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 6 days.

(21) Appl. No.: 12/703,007

(22) Filed: Feb. 9, 2010

(65) Prior Publication Data

US 2010/0271919 A1 Oct. 28, 2010

(30) Foreign Application Priority Data

Apr. 27, 2009 (JP) .................................. 2009-108065

(51) Int. Cl.
*G11B 7/00* (2006.01)

(52) U.S. Cl. ..................................................... 369/53.42

(58) Field of Classification Search ............... 369/30.94, 369/53.42
See application file for complete search history.

(56) References Cited

U.S. PATENT DOCUMENTS

| 2009/0059757 | A1* | 3/2009 | Haustein et al. | ........... 369/53.42 |
| 2010/0182887 | A1* | 7/2010 | Moody et al. | .............. 369/53.42 |

FOREIGN PATENT DOCUMENTS

| JP | 62-277661 A | 12/1987 |
| JP | 63-122056 A | 5/1988 |
| JP | 10-162402 | 6/1998 |
| JP | 2001-265538 A | 9/2001 |
| JP | 2006-018955 | 1/2006 |
| JP | 2006-018955 A | 1/2006 |

OTHER PUBLICATIONS

Notice of Rejection mailed by Japan Patent Office on May 11, 2010 in the corresponding Japanese patent application No. 2009-108065.

* cited by examiner

*Primary Examiner* — Adam R Giesy
(74) *Attorney, Agent, or Firm* — Knobbe, Martens, Olson & Bear LLP

(57) ABSTRACT

According to one embodiment, an information processor includes an optical disc drive, a recorder, and a determination module. The optical disc drive includes a loading mechanism that loads and ejects an optical disc. The recorder obtains state information indicating the operating state of the loading mechanism to record the state information. The determination module determines that, when a value related to failure prediction of the loading mechanism satisfies a predetermined condition, there is a risk of failure in the loading mechanism. The value is calculated from a combination of a plurality of indices contained in the state information.

8 Claims, 4 Drawing Sheets

FIG.5
G1
 PLEASE CONDUCT MAINTENANCE OF OPTICAL DISC DRIVE
PLEASE CONTACT SUPPORT CENTER FOR FURTHER ASSISTANCE
(CONTACT NUMBER: 0XX-0YY-00ZZ)
OK
G2
OPTICAL DISC IS EJECTED PROPERLY    OK
 PLEASE CONDUCT MAINTENANCE OF OPTICAL DISC DRIVE

INFORMATION PROCESSOR, FAILURE PREDICTION METHOD, AND COMPUTER PRODUCT

CROSS-REFERENCE TO RELATED APPLICATIONS

This application is based upon and claims the benefit of priority from Japanese Patent Application No. 2009-108065, filed on Apr. 27, 2009, the entire contents of which are incorporated herein by reference.

BACKGROUND

1. Field

One embodiment of the invention relates to an information processor, a failure prediction method, and a computer product.

2. Description of the Related Art

Information processors such as personal computers (PCs) are often provided with an optical disc drive (ODD) to read data from/write data to an optical disc including a compact disk (CD) and a digital versatile disk (DVD). The ODD has a disc tray on which an optical disc is placed, and is provided with a loading mechanism such as a loading motor for ejecting the disc tray or putting the disc tray in the housing. With this loading mechanism, an optical disc to be read or written is loaded into/ejected from the housing.

In such an information processor, if the loading mechanism of the ODD experiences a sudden failure, an optical disc cannot be loaded/ejected, resulting in inconvenience for the user. For this reason, some information processors with the ODD is capable of failure prediction and checks whether there is a risk of failure in the ODD.

Japanese Patent Application Publication (KOKAI) No. 2006-18955 discloses a known conventional technology related to ODD failure prediction. With the conventional technology, the number of loadings of the ODD, the number of seeks, and the number of data write blocks are counted and, when any of them exceeds a threshold, the use of the ODD or writing is prohibited.

According to the conventional technology, the risk of failure in the loading mechanism of the ODD is checked based only on the number of loadings as an index. When the number of loadings exceeds a predetermined threshold, it is determined that there is a risk of failure. Accordingly, failure prediction cannot be performed by taking into account the individual difference of the loading mechanism, user's use condition, and the like. As a result, highly accurate failure prediction cannot be achieved.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 5 is an exemplary schematic diagram of notification screen images on the information processor in the embodiment.

DETAILED DESCRIPTION

Figure 1:
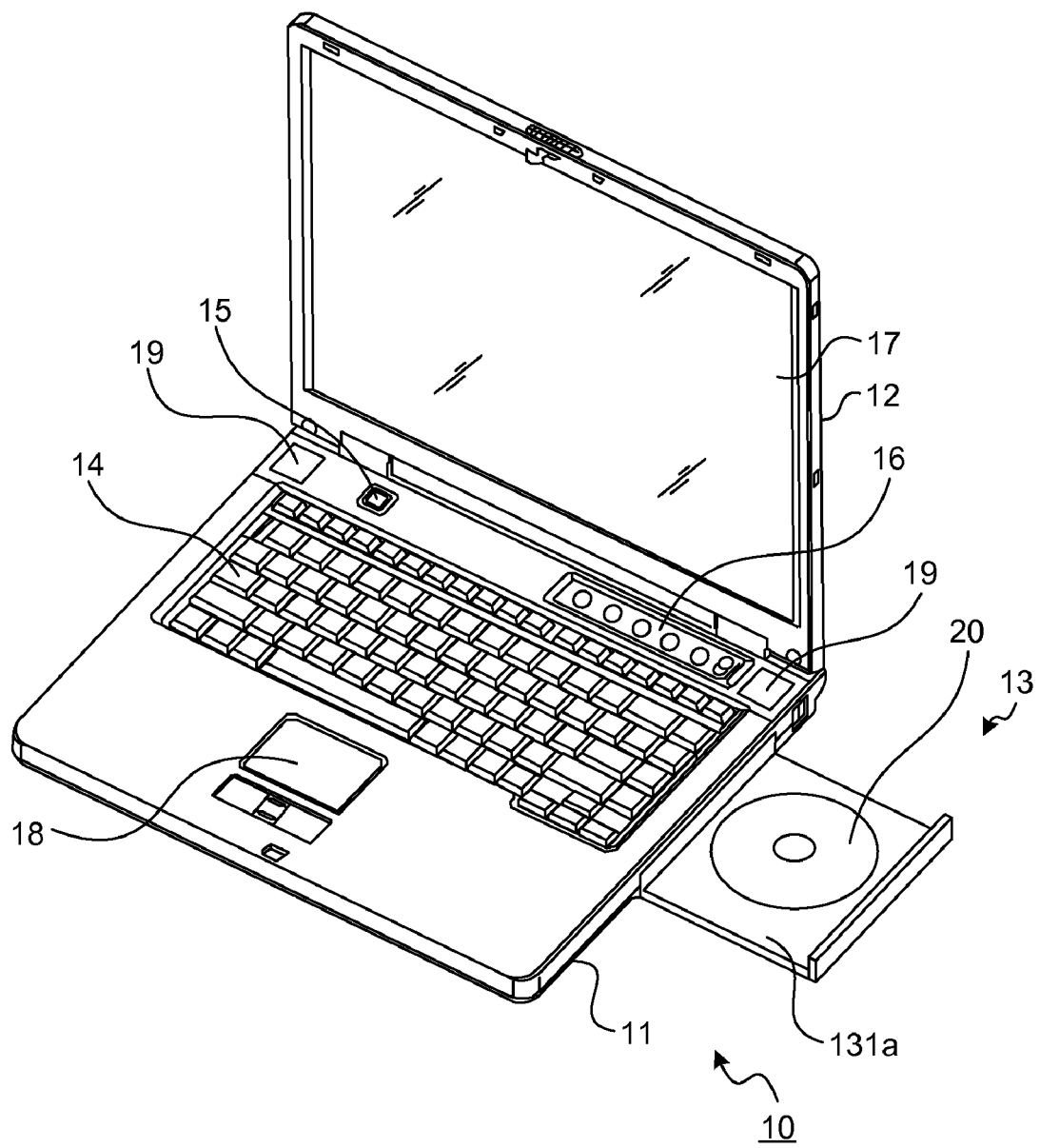
FIG. 1 is an exemplary perspective view of an information processor according to an embodiment of the invention.

Various embodiments according to the invention will be described hereinafter with reference to the accompanying drawings. In general, according to one embodiment of the invention, an information processor comprises an optical disc drive, a recorder, and a determination module. The optical disc drive comprises a loading mechanism configured to load and eject an optical disc. The recorder is configured to obtain state information indicating the operating state of the loading mechanism to record the state information. The determination module is configured to determine that, when a value related to failure prediction of the loading mechanism satisfies a predetermined condition, there is a risk of failure in the loading mechanism. The value is calculated from a combination of a plurality of indices contained in the state information.

According to another embodiment of the invention, there is provided a failure prediction method applied to an information processor comprising an optical disc drive that includes a loading mechanism configured to load and eject an optical disc for predicting a risk of failure in the loading mechanism, the failure prediction method comprises: a recorder obtaining state information indicating the operating state of the loading mechanism to record the state information; and a determination module determining that, when a value related to failure prediction of the loading mechanism satisfies a predetermined condition, there is a risk of failure in the loading mechanism. The value is calculated from a combination of a plurality of indices contained in the state information.

According to still another embodiment of the invention, there is provided a computer program product embodied on a computer-readable medium and comprising code that implements the above method.

An embodiment of the invention will be set forth in detail with reference to the drawings, in which like reference numerals refer to like elements throughout, and a redundant description will not be provided.

With reference to FIG. 1, a description will be given of an information processor according to the embodiment. FIG. 1 is a perspective view of an information processor 10 according to the embodiment.

As illustrated in FIG. 1, the information processor 10 is a notebook personal computer (PC). Although the information processor 10 is described by way of example as a notebook PC in the embodiment, it is not so limited and may be any device provided with an optical disc drive (ODD). The information processor 10 may be, for example, a desktop PC. Similarly, the detailed configuration of the information processor 10 is not limited to the example described below. For example, buses that connect between elements are not limited to those described below.

The information processor 10 comprises a main body 11 and a display module 12. Embedded in the display module 12 is a display device comprising a liquid crystal display (LCD) 17. The display screen of the LCD 17 is located substantially the center of the display module 12.

The display module 12 is rotatably supported on the main body 11. This allows the display module 12 to rotate between a closed position and an open position with respect to the main body 11. The main body 11 comprises a housing formed in a flat box shape. An ODD 13 is arranged on the right side surface of the main body 11. Further, arranged on the upper surface of the main body 11 are input devices and a speaker 19. The input devices include a keyboard 14, a power button 15 to turn on/off the information processor 10, an input operation panel 16 that receives various types of instructions or inputs, and a touchpad 18 as a pointing device.

The ODD 13 enables the reading/writing of data from/to an optical disc 20. More specifically, the ODD 13 comprises a disc tray 131a that is loaded/ejected by a loading motor (described later). The ODD 13 loads the optical disc 20 placed on the disc tray 131a into inside the main body 11, and reads data from or write data to the optical disc 20 through a read/write optical system (not illustrated) provided in the main body 11. Examples of the optical disc 20 include, but are not limited to, compact disc read-only memory (CD-ROM), compact disc-rewritable (CD-RW), CD+RW, and digital versatile disc read only memory (DVD-ROM).

The input operation panel 16 inputs in the system an event corresponding to a button pressed by the user. The input operation panel 16 is provided with a plurality of buttons that activate a plurality of functions, respectively. These buttons of the input operation panel 16 include, for example, a load/eject button to instruct the ODD 13 to load or eject the disc tray 131a. In the information processor 10, the loading motor, which will be described later, is driven in response to the depression of the load/eject button on the input operation panel 16, and thereby the disc tray 131a is loaded/ejected.

Figure 2:
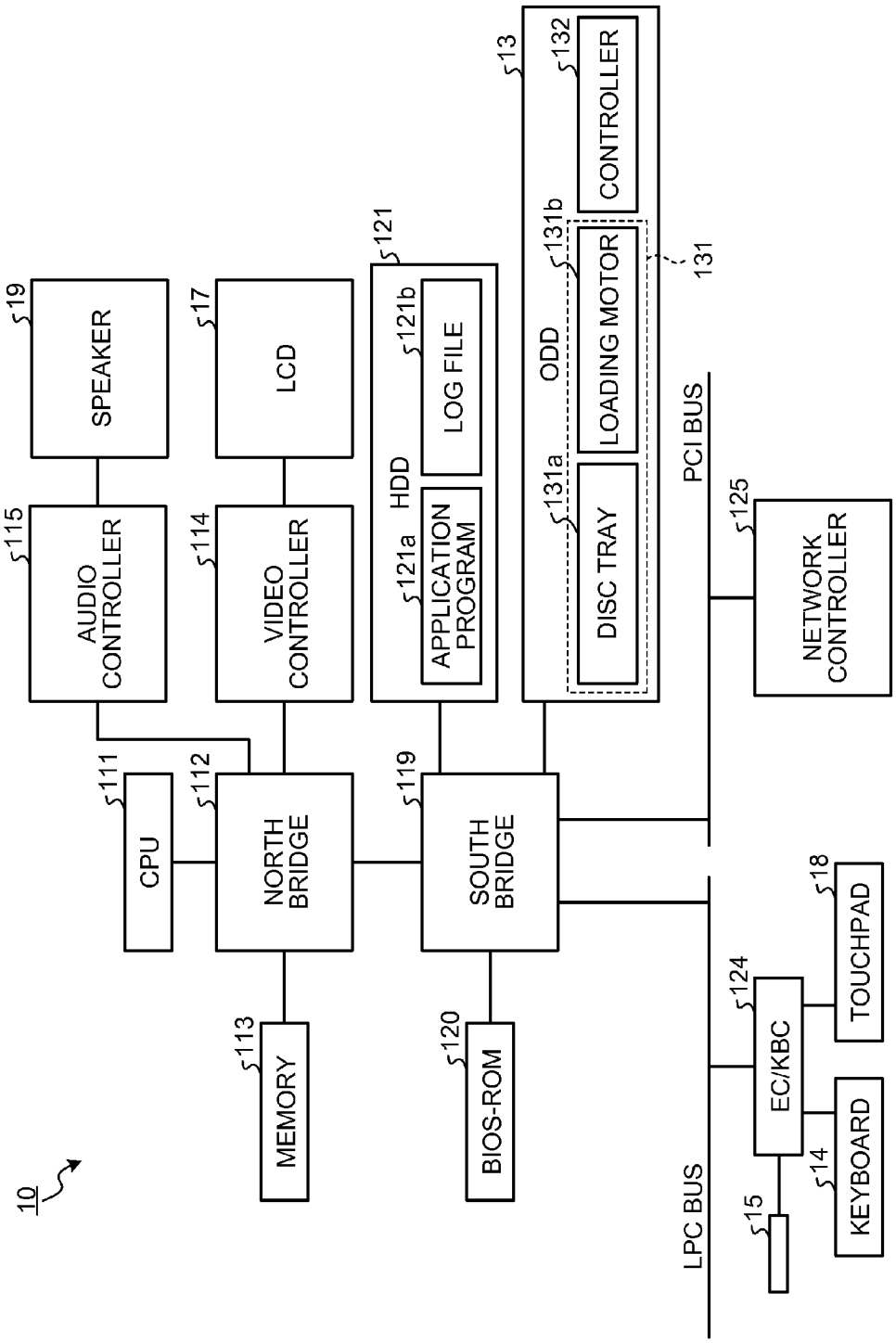
FIG. 2 is an exemplary block diagram of a system configuration of the information processor in the embodiment.

With reference to FIG. 2, a description will then be given of the system configuration of the information processor 10. FIG. 2 is a block diagram of an example of the system configuration of the information processor 10.

As illustrated in FIG. 2, the information processor 10 comprises a central processing unit (CPU) 111, a north bridge 112, a memory 113, a video controller 114, an audio controller 115, a south bridge 119, a BIOS-ROM 120, a hard disk drive (HDD) 121, an embedded controller/keyboard controller (EC/KBC) 124, and a network controller 125. In FIG. 2, the CPU 111 is connected to each element via either or both the north bridge 112 and the south bridge 119; however, this is by way of example only. In the information processor 10, the CPU 111 may be connected to each element via a bus.

The CPU 111 is a processor that controls the overall operation of the information processor 10. The CPU 111 executes an operating system (OS) loaded from the HDD 121 into the memory 113 and an application program 121a. When the CPU 111 executes the application program 121a, the ODD 13 at least reads data from or writes data to the optical disc 20 loaded therein.

The CPU 111 also executes a system basic input-output system (BIOS) stored in the BIOS-ROM 120. The system BIOS is a program for hardware control.

The north bridge 112 connects between a local bus of the CPU 111 and the south bridge 119. The north bridge 112 comprises a built-in memory controller that controls access to the memory 113. The north bridge 112 has the function of communicating with the video controller 114 and the audio controller 115 via an accelerated graphics port (AGP) bus or the like.

The memory 113 is a volatile memory and provides a work area where the CPU 111 executes the application program 121a. The video controller 114 is a video reproduction controller that controls the LCD 17 used as a display monitor of the information processor 10. The audio controller 115 is an audio reproduction controller that controls the speaker 19.

The south bridge 119 controls each device on a peripheral component interconnect (PCI) bus as well as a low pin count (LPC) bus. The south bridge 119 comprises a built-in controllers such as integrated drive electronics (IDE) and an advanced technology attachment packet interface (ATAPI) to control the ODD 13 and the HDD 121 as a storage device that stores various types of software and data. Besides, the south bridge 119 has the function of controlling access to the BIOS-ROM 120.

The HDD 121 stores the application program 121a, a log file 121b, and various types of setting information. Incidentally, while the information processor 10 is described herein as comprising the HDD 121 as the storage device thereof, the storage device is not limited to HDD and may be, for example, a semiconductor memory.

The EC/KBC 124 is a one-chip microcomputer comprising the integration of an embedded controller (EC) for power management and a keyboard controller (KBC) for controlling the keyboard 14 and the touchpad 18. The EC/KBC 124 has the function of turning on/off the information processor 10 in response to user's operation on the power button 15. The network controller 125 is a communication device that communicates with an external network such as the Internet.

The ODD 13 comprises a loading mechanism 131 and a controller 132. The loading mechanism 131 comprises the disc tray 131a and a loading motor 131b. The loading motor 131b drives the disc tray 131a and loads/ejects the disc tray 131a under the control of the controller 132. Incidentally, the loading mechanism 131 need not necessarily comprise the disc tray 131a as long as it is configured to be capable of putting the optical disc 20 in or take it out of the housing of the information processor 10. For example, the loading mechanism 131 may be configured such that the optical disc 20 is loaded into the housing by a carrying roller provided at the insert/eject slot.

The controller 132 controls the operation of the ODD 13 according to a control signal (for example, ATAPI command) issued under the control of the CPU 111. More specifically, the controller 132 controls the operation of the loading mechanism 131 to load/eject the optical disc 20, and read data from or write data to the optical disc 20 loaded in the ODD 13.

The controller 132 comprises a volatile memory and a non-volatile memory (both not illustrated). The non-volatile memory stores information unique to the machine such as vendor information, model number, and firmware revision. Meanwhile, the volatile memory stores the operating state of the ODD 13 while it is operating according to a control signal as state information. The controller 132 updates the state information stored in the volatile memory based on the operation of the ODD 13 according to a control signal. Examples of the state information include information related to reading/writing (the rotation time of the spindle motor, the number of times the spindle motor has been turned on and off, seek time, etc.), and information on the loading mechanism 131.

Examples of the information on the loading mechanism 131 include, as a plurality of indices, the drive time of the loading motor 131b, disc load count indicating the number of times the optical disc 20 is loaded, disc load error count indicating the number of times error occurs when the optical disc 20 is loaded, disc load retry count indicating the number of times disc loading is retried, disc eject count indicating the number of times the optical disc 20 is ejected, disc eject error count indicating the number of times error occurs when the optical disc 20 is ejected, and disc eject retry count indicating the number of times disc eject is retried.

The controller 132 notifies the CPU 111 of the information stored in the volatile memory and the non-volatile memory according to a control signal issued under the control of the CPU 111. Accordingly, the CPU 111 can obtain the information on the loading mechanism 131 through, for example, an ATAPI command.

Figure 3:
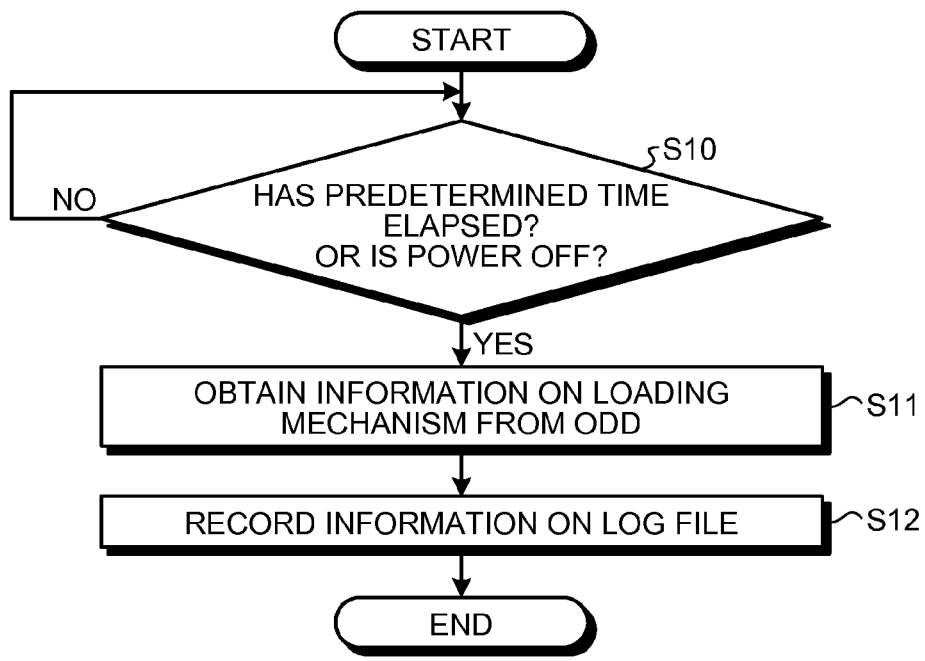
FIG. 3 is an exemplary flowchart of log file recording performed by the information processor in the embodiment.

With reference to FIG. 3, a description will now be given of log file recording in which the CPU 111 executes the application program 121*a* to obtain the information on the loading mechanism 131 and records the information on the log file 121*b*. FIG. 3 is a flowchart of an example of log file recording.

As illustrated in FIG. 3, first, the CPU 111 determines whether a predetermined time has elapsed or whether to stop power supply to the ODD 13 because, for example, the power is turned off by the power button 15 (S10). At S10, the CPU 111 determines to stop power supply to the ODD 13 when the information processor 10 is shut down, in standby mode, or in hibernation mode, when the ODD 13 is removed, or the like.

When a predetermined time has elapsed, or when power supply to the ODD 13 is stopped (Yes at S10), the CPU 111 outputs a control signal such as an ATAPI command to obtain the information on the loading mechanism 131 (S11). The CPU 111 then records the information on the log file 121*b* as a log (S12).

More specifically, the CPU 111 obtains the drive time of the loading motor 131*b*, disc load count, disc load error count, disc load retry count, disc eject count, disc eject error count, disc eject retry count, and the like, and records them on the log file 121*b*. That is, in the information processor 10, by reading the log file 121*b*, it is possible to obtain the total drive time and the total number of times an event has occurred in addition to the drive time and the number of times the event has occurred recorded at a particular point in time.

By the log file recording as described above, in the information processor 10, the information on the loading mechanism 131 of the ODD 13 is stored in the HDD 121 as the log file 121*b* at predetermined time intervals. Besides, before power supply to the ODD 13 stops and the information on the loading mechanism 131 is reset, the information can be stored in the HDD 121.

Figure 4:
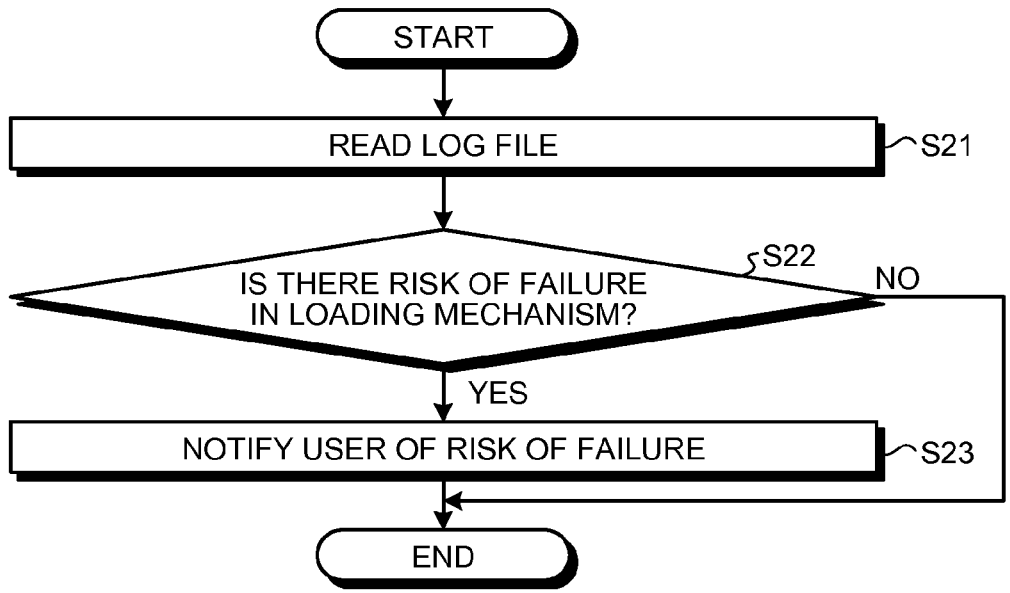
FIG. 4 is an exemplary flowchart of failure risk notification performed by the information processor in the embodiment.

Next, the CPU 111 executes the application program 121*a* to check the risk of failure in the loading mechanism 131. If there is a risk of failure, the CPU 111 notifies the user of the risk of failure. This failure risk notification will be described with reference to FIGS. 4 and 5. FIG. 4 is a flowchart of an example of the failure risk notification. FIG. 5 is a schematic diagram of examples of notification screen images G1 and G2 displayed on the LCD 17 when there is a risk of failure.

As illustrated in FIG. 4, first, the CPU 111 reads the log file 121*b* (S21). The CPU 111 then checks whether there is a risk of failure in the loading mechanism 131 based on the information recorded on the log file 121*b* (S22).

At S22, the CPU 111 determines that there is a risk of failure not only when one of the indices related to failure prediction, such as the total drive time of the loading motor 131*b* and the total number of times an event has occurred, exceeds a predetermined threshold. In addition, the CPU 111 also determines that there is a risk of failure when a combination of a plurality of the above indices exceeds a predetermined threshold. Further, the CPU 111 may compare a combination of a plurality of the indices, such as the drive time and the number of times an event has occurred, most recently recorded with a combination of those recorded previously. In this case, if the most recently recorded value has substantially changed from the previous value (for example, the value has increased at a high rate), the CPU 111 may determine that there is a risk of failure.

More specifically, when the disk load error rate calculated from disc load error count/disc load count, the disk eject error rate calculated from disc eject error count/disc eject count, the disk load retry rate calculated from disc load retry count/disc load count, the disk eject retry rate calculated from disc eject retry count/disc eject count, or the like exceeds a predetermined threshold, or when the value of any of them most recently recorded has substantially changed, the CPU 111 determines that there is a risk of failure.

As described above, failure prediction cannot be performed by taking into account the individual difference of the loading mechanism, user's use condition, and the like based only on a single index. Therefore, according to the embodiment, it is checked whether there is a risk of failure based on a rate at which an event that involves a risk of failure occurs. Such a rate is calculated from the number of times an event that may cause failure such as retry and error has occurred (for example, disc load error count, disc eject error count, disc load retry count, and disc eject retry count) and the total number of times an event has occurred (for example, disc load count and disc eject count). This enables highly accurate failure prediction taking into account the individual difference of the loading mechanism 131, user's use condition, and the like.

Further, it may be determined that there is a risk of failure when the drive time required for one load/eject of a disc, which is obtained by dividing the drive time of the loading motor 131*b* by the disc load count or the disc eject count, exceeds a predetermined threshold, or when the value most recently recorded has substantially changed.

When the ODD 13 has been used for a long time, for example, slip is likely to occur in a portion that transmits power due to the friction of the drive of the loading mechanism 131. This may prolong the drive time required for one load/eject of a disc. Therefore, according to the embodiment, it is checked whether there is a risk of failure based on the drive time required for one load/eject of a disc calculated from a combination of a plurality of the above indices. Thus, even if an event that may cause failure such as retry and error has not occurred, it is possible to achieve highly accurate failure prediction taking into account the individual difference of the loading mechanism 131, user's use condition, and the like.

A combination of the above indices is not particularly limited, and any combination may be used if the risk of failure can be predicted based on the combination. For example, by calculating the number of errors related to the loading and ejecting of an optical disc as (disc load error count+disc eject error count)/2, a rate at which an event that involves a risk of failure occurs may be calculated based on the calculated number of errors and the total number of times the optical disc has been loaded/ejected.

When determining that there is a risk of failure (Yes at S22), the CPU 111 notifies the user that there is a risk of failure in the loading mechanism 131 (S23). More specifically, the CPU 111 reads a notification screen image indicating the risk of failure from the setting information stored in the HDD 121 and displays it on the LCD 17, thereby notifying the user of the risk of failure. Incidentally, the CPU 111 may notify the user that there is a risk of failure by audio output from the speaker 19 apart from the display on the LCD 17.

More specifically, as illustrated in FIG. 5, the CPU 111 displays the notification screen image G1 on the LCD 17 for the user to encourage the maintenance of the ODD 13. The notification screen image G1 may contain contact information on a support center so that the user can contact the support center when failure cannot be fixed by user maintenance.

The CPU 111 may perform the failure risk notification as described above at any time such as when the information processor 10 is turned on, when a predetermined time has elapsed, when the optical disc 20 is loaded into/ejected from the ODD 13, or the like. For example, in the case where the failure risk notification is performed when the optical disc 20 is ejected from the ODD 13 and the user is notified of a risk of failure, an image such as the notification screen image G2 may be displayed that contains a message for notifying the user that the optical disc 20 has been ejected properly. In this manner, if notifying the user of a risk of failure when the optical disc 20 is ejected, the information processor 10 can encourage the user to undertake maintenance of the ODD 13 at a time suitable for maintenance when the optical disc 20 is not present in the ODD 13.

While, in the embodiment, the application program 121a executed on the information processor 10 is described as being stored in advance in the HDD 121, it may be provided as being stored in advance in another storage device such as ROM. The application program 121a may also be provided as being stored in a computer-readable storage medium, such as a compact disk read-only memory (CD-ROM), a flexible disk (FD), a compact disc-recordable (CD-R), or a digital versatile disc (DVD), in an installable or executable format.

The application program 121a executed on the information processor 10 may also be stored in a computer connected via a network such as the Internet so that it can be downloaded therefrom via the network. Further, the application program 121a may be provided or distributed via a network such as the Internet.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processor comprising:
an optical disc drive comprising a loading mechanism configured to load an optical disc and to eject the optical disc;
a recorder configured to obtain state information indicating an operating state of the loading mechanism, and to store a log of the state information; and
a determination module configured to determine that there is a risk of failure in the loading mechanism when a rate of increase from a previous value to a most recent value is greater than a predetermined threshold value, the previous value being before the most recent value, the most recent value and the previous value corresponding to the determination of the risk of failure of the loading mechanism, the most recent value being calculated by combining a plurality of indices comprised in the state information recorded most recently, the previous value being calculated by combining a plurality of indices comprised in the state information recorded previously before the most recent recording of the state information.

2. The information processor of claim 1, wherein the determination module is configured to determine that there is the risk of failure in the loading mechanism when a rate of increase from a previous ratio to a most recent ratio is greater than a predetermined threshold value, the previous ratio being before the most recent ratio, the most recent ratio and the previous ratio being a ratio at which an event involving the risk of failure occurred, the most recent ratio and the previous ratio being calculated from a total number of times the optical disc has been loaded or ejected and a number of times the event has occurred.

3. The information processor of claim 1, wherein the determination module is configured to determine that there is the risk of failure in the loading mechanism when a rate of increase from a previous drive time of the loading mechanism to a most recent drive time of the loading mechanism is greater than a predetermined threshold, the previous drive time being before the most recent drive time, the previous drive time and the most recent drive time being for one load or one eject, the previous drive time and the most recent drive time being calculated from a total number of times the optical disc has been loaded or ejected and a drive time of the loading mechanism.

4. The information processor of claim 1, wherein the recorder is configured to receive the state information when power supply to the optical disc drive is stopped in order to record the state information.

5. The information processor of claim 1, further comprising a notification module configured to issue a notification, when there is the risk of failure in the loading mechanism based on the determination of the determination module.

6. The information processor of claim 5, wherein the notification module is configured to issue the notification when the optical disc is ejected.

7. A failure prediction method applied to an information processor comprising an optical disc drive that comprises a loading mechanism configured to load an optical disc and to eject the optical disc, for predicting a failure in the loading mechanism, the failure prediction method comprising:
obtaining, by a recorder, state information indicating an operating state of the loading mechanism, and storing a log of the state information; and
determining, by a determination module, that there is a risk of failure in the loading mechanism when a rate of increase from a previous value to a most recent value is greater than a predetermined threshold value, the previous value being before the most recent value, the most recent value and the previous value corresponding to the determination of the risk of failure of the loading mechanism, the most recent value being calculated by combining a plurality of indices comprised in the state information recorded most recently, the previous value being calculated by combining a plurality of indices comprised in the state information recorded previously before the most recent recording of the state information.

8. A computer program product embodied on a computer-readable medium and comprising code that, when executed on a computer comprising an optical disc drive that comprises a loading mechanism configured to load an optical disc and to eject the optical disc, causes the computer to:
obtain state information indicating an operating state of the loading mechanism, and store a log of the state information; and
determine that there is a risk of failure in the loading mechanism when a rate of increase from a previous value to a most recent value is greater than a predetermined threshold value, the previous value being before the most recent value, the most recent value and the previous value corresponding to the determination of the risk of failure of the loading mechanism, the most recent value being calculated by combining a plurality of indices comprised in the state information recorded most recently, the previous value being calculated by combining a plurality of indices comprised in the state information recorded previously before the most recent recording of the state information.

* * * * *